Dec. 9, 1969  G. W. HOWARD  3,482,442
BELT TENSION DETERMINING INSTRUMENT
Filed Feb. 26, 1968  2 Sheets-Sheet 1
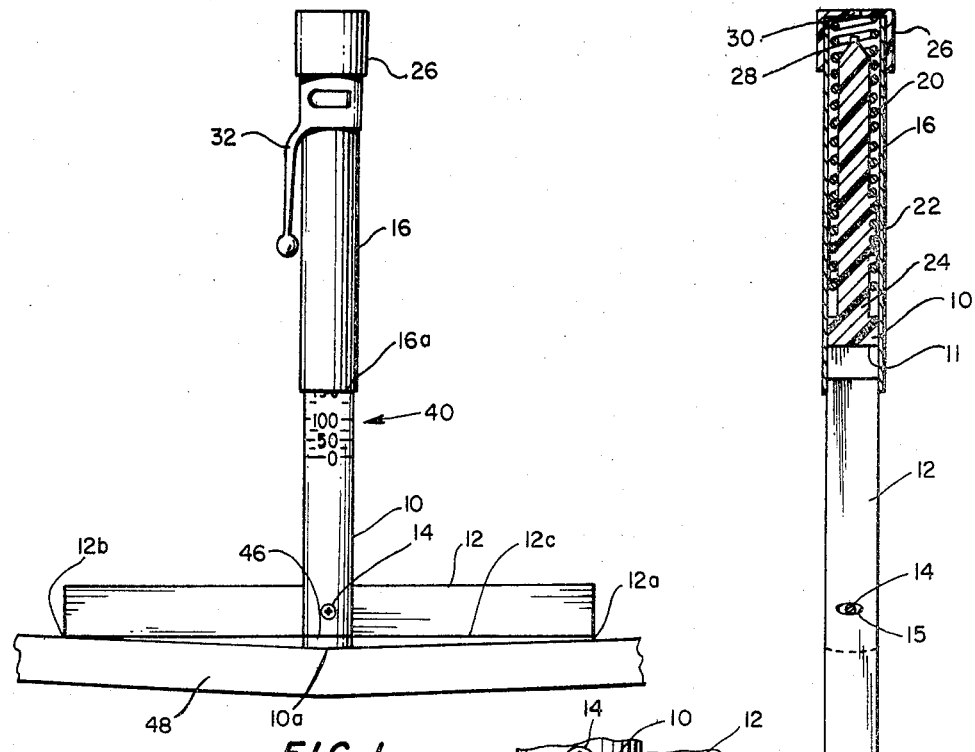
FIG. 1
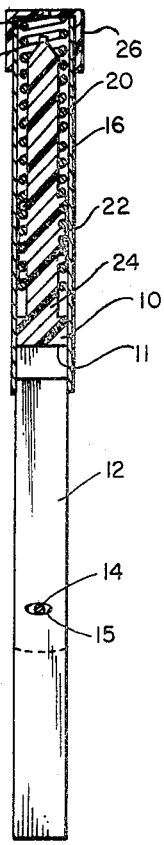
FIG. 2
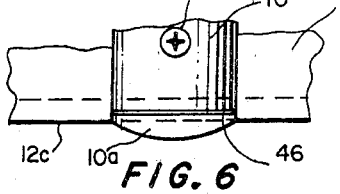
FIG. 6
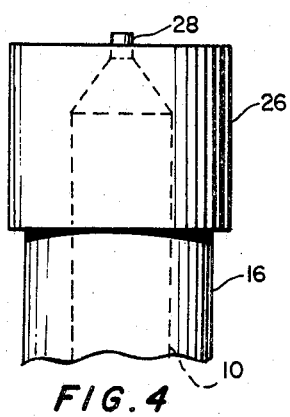
FIG. 3
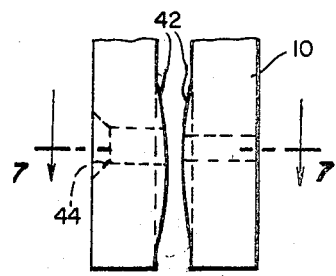
FIG. 4
FIG. 5
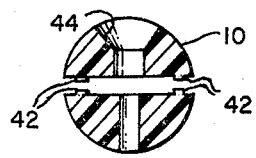
FIG. 7
INVENTOR.
GRAHAM W. HOWARD
BY
Richard D. Law
ATTORNEY United States Patent Office 3,482,442
Patented Dec. 9, 1969

3,482,442
BELT TENSION DETERMINING INSTRUMENT
Graham W. Howard, 5996 S. Crocker St.,
Littleton, Colo. 80120
Filed Feb. 26, 1968, Ser. No. 708,031
Int. Cl. G01l 5/12
U.S. Cl. 73—144                                11 Claims

ABSTRACT OF THE DISCLOSURE

An instrument for determining the tension on single strand belt drives having a three-point contact system means for determining the angle of depression of the belt includes a predetermined tension setting. The instrument is provided with an indicator so that when a predetermined tension is reached a visual or touch signal is given, and further, includes means to visually determine whether the belt has a tension above or below the predetermined setting.

---

Belt drives between a powered pulley and one or more driven pulleys are utilized extensively throughout all industry. Large scale users include automobiles, trucks and all manner of vehicles, household appliances, such as refrigerators, air-conditioners, washers, etc., electronic equipment, such as computers, printers, light and heavy machinery, among dozens of other uses. As the trend toward mechanization has increased in all countries of the world, so the need and the use of belt drives has likewise increased. Belt manufactures in recent years have not only changed the configuration of drive belts but have substantially changed the composition of some of the belts. By using strong, exotic materials the cross-sectional area of the belts has generally decreased, making narrow, thin belts with considerably less material required for the drive belt. A belt drive operates very efficiently when properly tensioned and generally provides a long life for the belt and the equipment on which the belt is used. Improper tension leads to noisy and slipping belts, excessive pressure on shaft bearings, generally poor operation, and reduced life of the belt.

Particularly with single strand belts, the use of the smaller cross-section belts has dramatically pointed out the need for properly tensioning belts for optimum wear of the belts and the machinery parts. This is particularly true in the automobile industry as well as the household business. At present there are no simple instruments available with which a mechanic or technician can test the tension of the belt on the equipment to ascertain the tension. It is, therefore, among the objects and advantages of this invention to provide a simplified belt tension tester arranged for a predetermined setting and means for indicating belt tension above or below said predetermined setting.

Another object of the invention is to provide an instrument for determining belt tension including a visual and/or feel indicator upon reaching a predetermined setting.

A still further object of the invention is to provide an instrument for testing belt tension which includes a minimum of parts of simplified construction and simple manipulations for use.

These and other objects and advantages of the invention may be readily ascertained by referring to the following description and appended illustrations in which:

FIG. 1 is a side elevational view of a belt testing instrument, in position for testing belt tension according to the invention;

FIG. 2 is a cross-sectional, side elevation of an instrument for testing belt tension, showing the folded position of the unit;

FIG. 3 is a reduced scale side elevational view of the instrument in closed position;

FIG. 4 is an enlarged detail of the indicator of the instrument of the invention, illustrated in indicating position;

FIG. 5 is an enlarged detail of the construction of the body of the instrument, showing a friction holding mechanism for the cross-arm according to the invention;

FIG. 6 is an enlarged view of the belt feeler end of the instrument, according to the invention, showing over and under tension positions of predetermined belt tension;

FIG. 7 is a cross-sectional view of the instrument of FIG. 6 taken along section line 7—7.

Figure 8:
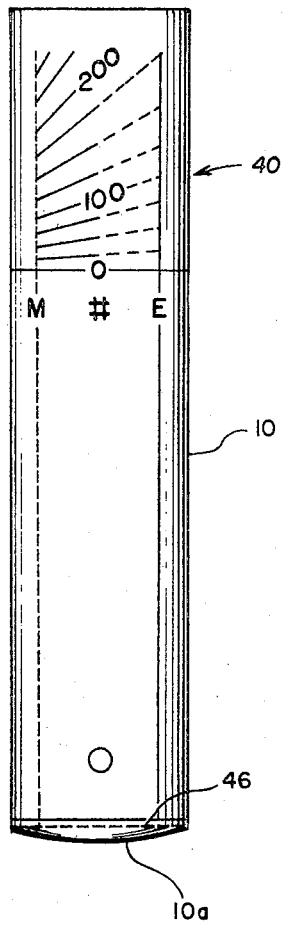
FIG. 8 is an enlarged view of the body of the instrument of FIG. 1, showing a double scale configuration.

In general the instrument for testing belt tension according to the invention includes a body having a generally perpendicular feeler-bar arranged at one end in position to move axially of the body a short distance, a telescoping tube over the body and a helical spring between the body and the tube for applying a predetermined force on a belt. The spring is threaded to the body in such a manner that the force to be applied may be predetermined by varying the free height of the spring.

In the device illustrated, a cylindrical body 10 is provided with a pivotal feeler-bar 12 at one end secured to the body 10 by means of a pivot pin 14. The feeler-bar 12 has an elongated opening 15 and is arranged to pivot around the pivot pin 14 is explained below. A tubular member 16 is telescoped over the opposite end of the belt tension tester, and it is retained on the body 10 by means of a helical spring 20. The body 10 is provided with threads 22 in a necked-down portion 24 at the top thereof to provide means for threading and holding the spring 20 onto the body 10. The number of threads on the body are sufficient to securely hold the spring in a substantial range of positions. The spring is frictionally held at the top of the tube 16, and a cap 26 completes the assembly. The body 10 is provided with a small extension 28 which is arranged to extend through an opening 30 in the cap 26 as an indicator when the tube 16 is pressed onto the body 10. For convenience in carrying, a pocket clip 32 is provided on the tube 16. The feeler-bar 12 is provided with an elongated opening 15 slidably fitting around the pivot pin 14. The elongated opening permits the feeler-bar to move longitudinally or axially of the body 10 when in its extended position, as illustrated and explained below. Imprinted on the body 10 is a scale 40 which is arranged in pounds tension and provides a means for presetting the instrument when the tube 16 is threaded down on the body. The lower end 16a of the tube provides an indicator on the scale 40. The body 10 is partially split and the split terminates at 11 to permit the feeler-bar 12 to be turned into axial alignment with the body 10, so that it may be placed in the pocket of the user as desired.

When the feeler-bar 12 is turned into operative position with its longitudinal axis perpendicular to the axis of the body 10, it may move axially of the body by means of the elongated slot through which the pivot pin 14 passes. To assure holding pressure on the feeler-bar by the body 10, small risers 42 on the inside surface of the slot press against the feeler-bar to resist movement of the feeler-bar and tending to hold it in position. As shown in FIGS. 5 and 7, the risers are exaggerated to illustrate this particular means for applying friction pressure on the feeler-bar. The passage 44 through the body 10 may be threaded to permit pivot pin 14 to be secured in position in the body, and to draw the ends of the body together to provide the holding pressure on the feeler-bar. This insures sufficient force will be applied on the feeler-bars.

When using the instrument of the invention, the tube 16 is unthreaded to permit the feeler-bar to be pivoted to a right angle to the body 10, and the tube 16 is then threaded onto the body 10 so that the bottom edge 16a is on the desired mark shown in the scale 40. Normally the manufacturer of the belt will provide instructions as to the proper tension for the belt for optimum operation. The scale 40, being identified in pounds tension provides an easy and quick method of presetting the instrument to the prescribed tension for the belt. The feeler-bar is manually pulled outwardly to its maximum position towards the end 10a of the body 10, as shown in FIG. 6, so that the bottom edge 12c of the feeler-bar 12 is below an indicator line 46 marked near the bottom of the body 10. In this position the instrument is ready for use. As shown in FIG. 1, the instrument is placed on a belt 48, being placed approximately in the middle of one span of the belt between a pair of pulleys. The body 10 should be approximately perpendicular to the longitudinal belt top of the center line at that point. The tube 16 is then pressed downwardly onto the body 10 until the tip 28 appears at the opening in the cap 26. The tip 28 extends through the opening cap 26 when the lower edge 16a of the tube 16 is at the zero mark on the scale, which indicates the predetermined pressure is reached. The movement of the tip through the opening of the cap may be determined by feel, as when a user's finger on top of the instrument pressing downwardly is touched by the tip, or it may be visually observed as it enters the opening in the cap 26. In either instance, however, the predetermined pressure applied on the tube 16 is indicated by the extension 28. For dark places which are not easily observed, the feel method with the user's finger is preferred. As the pressure is applied on the tube 16 the belt 48 is depressed slightly by the end 10a of the body 10 to the position where the outer bottom corners 12b and 12c of the feeler-bar 12 touch the belt. If the belt tension is less than the preset tension, the feeler-bar is moved upwardly so that the indicating edge 12c is above the gauge line 46, and the indication is that the belt needs to be tightened. Where the tension on the belt is above the preset tension, the indicating edge 12c will be below the line 46, and a loosening of the belt as indicated. Where the tension is approximately at the predetermined tension, the indicating line 12c of the feeler-bar will be in alignment with the gauge line 46. When the gauge is removed from the belt the tube 16 returns to its preset figure with the bottom edge 16a on a number of pounds indicated on the gauge, however, the feeler-bar is held in position for examination by the user.

One widely accepted method of determining belt tension is to determine the pressure necessary to depress a stretch of belt a predetermined amount. In one system a belt is depressed 1/64 inch per inch of span, and another system depresses the belt 1 mm. per 100 mm. of span. The indicating line may be set for either system or two lines provided so the instrument may be equally used for both systems. The length of the feeler-bar is preset and is calculated for the distance from the indicator line to belt contact point of the body. The scale may be made in pounds force or in pounds tension or both with conversion lines between comparable figures.

As shown in FIG. 8, the instrument may be provided with two scales which are connected. One scale uses the solid line 46, and the indicating line M extends from that line to the left side of the scale. This is for use with the metric system where the belt is depressed 1 mm. per 100 mm. of span. The right side of the scale is used for the English system where the belt is depressed 1/64 inch per inch of span, and the indicating line E extends to the dashed indicator line immediately above line 46. The two scales are related as shown by the intersecting lines, every fourth being numbered. The first numbered line is 100 to indicate 100 lbs. force, each unnumbered line is an indicia for 25 lbs.

The relation between the two scales is shown in following table which is calculated for a particular configuration in which the length of tube 16 is 2.817 inches and has a travel from the zero point to top of the scales of 0.660 inch. The force required to produce a particular depression is the tension divided by the ratio of belt depression to span, i.e., either 16 for the English or 25 for the metric systems, and is $F=T/16$ or $F'=T/25$. This is shown in the table. Since the tube must be moved to have the bottom edge at the desired number of pounds, the length of the working coil must change and this is shown as $Z$ (for the English), and $Z'$ (for the metric) in table for each line on the scales. For the particular size the depression $K$ or $K'$ (English and metric system respectively) is $Z-0.84$ or $Z'-0.84$. $K/Z$ or $K'/Z'$ is the depression divided by the working length of the coils of the spring. Thus the distance between the 25-pound marks for each scale are determined, and the distance between the lines is $K/Z$ or $K'/Z'$.

TABLE I

| K'/Z' | K'  | Z'    | F'   | T   | F      | Z     | K     | K/Z   |
|-------|-----|-------|------|-----|--------|-------|-------|-------|
|       |     | (T/25) |     | lbs.|  (T/16)|       |       |       |
| 0     | 0   | .84   | 0    | 0   | 0      | .84   | 0     | 0     |
| .04   | .035| .875  | 1.0  | 25  | 1.5631 | .896  | .056  | .0625 |
| .08   | .073| .913  | 2.0  | 50  | 3.125  | .960  | .120  | .125  |
| .12   | .115| .955  | 3.0  | 75  | 4.688  | 1.034 | .194  | .188  |
| .16   | .160| 1.000 | 4.0  | 100 | 6.250  | 1.120 | .280  | .250  |
| .20   | .210| 1.050 | 5.0  | 125 | 7.813  | 1.222 | .382  | .313  |
| .24   | .265| 1.105 | 6.0  | 150 | 9.375  | 1.344 | .504  | .375  |
| .28   | .327| 1.167 | 7.0  | 175 | 10.938 | 1.493 | .653  | .438  |
| .32   | .395| 1.235 | 8.0  | 200 | 12.500 | 1.680 | .840  | .500  |
| .36   | .472| 1.312 | 9.0  | 225 | 14.063 | 1.920 | 1.080 | .563  |
| .40   | .560| 1.400 | 10.0 | 250 | 15.625 | 2.240 | 1.400 | .625  |
| .44   | .660| 1.500 | 11.0 | 275 | 17.200 | 2.688 |       | .688  |

The above table is based on a theoretical force diagram, for the particular configuration of the instrument described above, and it does not take into such matters as belt stiffness, and other variables which occur in practice. These differences may be compensated by the user of the instrument.

The scales are then marked on the body 10 using the K and K' figures to space each 25-pound gradient line for the English and metric scales respectively. The corresponding marks are the cross-tied as shown. The scales and the cross-ties may be used by operator at his discretion depending on which system the belt manufacturer has used to suggest the tension most desirable for the belt. The cross-ties may be used to estimate belt tension where the value exceeds the scale, i.e., above 175 lbs. on the English scale or where the edge of the feeler-bar is not exactly on either of the indicia lines 46 or the dashed line.

For convenience, the instrument may be made with a stainless steel tube 16 and a tough plastic body 10, such as Du Pont Zytel or equivalent. When made of the plastic, of course, the body may be injection molded, ready for marking and assembly. The simplicity of the device with only six parts provides a very effective instrument with minimum of assembly. Also, the use of the predetermined tension setting requires the operator to check the belt manufacturer's manual to obtain the desired tension for the belt, which insures that the belt will operate at its optimum tension for effective operation.

I claim:

1. An instrument for determining tension in a belt drive comprising a body having a cylindrical threaded portion adjacent one end, the opposite end thereof arranged to contact a belt drive; a helical spring threadedly engaging said threaded portion and adjustable thereon; a tube telescoped over said spring and secured to the outer end of said spring so as to resiliently be movable over a portion of said body; first indicia means cooperatively arranged between said body and said tube for indicating relative position therebetween and provide a preset movement therebetween; a laterally disposed feeler-bar mounted adjacent said opposite end and movable through a limited distance axially of said body, said feeler-bar including belt contacting portions equally spaced on opposite sides of said body; an indicia line marked on said body adjacent said opposite end cooperative with said feeler-bar for indicating relative position therebetween; and a cap mounted on said tube cooperative with said one end indicating maximum travel of said tube onto said body against spring resistance.

2. An instrument according to claim 1 in which said cap has an aperture therethrough and said one end includes a depending portion dimensioned to extend through said aperture when maximum travel of said tube on said body is reached.

3. An instrument according to claim 1 wherein the bottom edge of said tube forms an indicator line and a scale on said body provides a measurement of the distance of travel of said bottom edge along said body.

4. An instrument according to claim 1 wherein said feeler-bar is dimensioned so that its belt contacting points are spaced a distance apart to provide a desired belt depression at a preset force.

5. An instrument according to claim 1 wherein said feeler-bar is a bar having an indicia line for matching with said indicia mark on said body.

6. An instrument according to claim 5 wherein said indicia line is the bottom edge of said feeler-bar.

7. An instrument according to claim 5 wherein said indicia line provides an indication of belt tension which is the same, over or under the preset tension on said first indicia means.

8. An instrument according to claim 1 wherein said opposite end of said body is bifurcated and said feeler-bar is pivotally mounted therein, so as to permit said feeler-bar to pivot with its axis in alignment with the axis of said body.

9. An instrument according to claim 8 wherein said feeler-bar has an elongated slot laterally of its axis to permit limited movement axially of said body.

10. An instrument according to claim 8 wherein projections are formed at the inside edges of said bifurcated end to provide pressure on said feller-bar to provide resistance to movement of said feeler-bar.

11. An instrument according to claim 1 wherein said first indicia means includes spaced English and a metric scales marked on said body, each said scale marked in the same increments of tension and corresponding marks on said scales being cross-tied by lines; and two indicia lines at end of said body cooperative with said feeler-bar and each having an indicating line extending from it to its respective scale.

References Cited

UNITED STATES PATENTS

| | | | |
|---|---|---|---|
| 1,670,685 | 5/1928 | Marks | 73—81 |
| 3,171,278 | 3/1965 | Howard | 73—144 |
| 3,352,153 | 11/1967 | Howard | 73—144 |

CHARLES A. RUEHL, Primary Examiner